(12) United States Patent
Liu et al.

(10) Patent No.: US 8,054,642 B2
(45) Date of Patent: Nov. 8, 2011

(54) APPARATUS FOR RETAINING A COMPUTER CARD

(75) Inventors: Tony K H Liu, Changhua (TW); Ian Lin, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 12/146,719

(22) Filed: Jun. 26, 2008

(65) Prior Publication Data
US 2009/0002960 A1 Jan. 1, 2009

(30) Foreign Application Priority Data

Jun. 28, 2007 (TW) ................. 96123526 A

(51) Int. Cl.
*H05K 5/00* (2006.01)
(52) U.S. Cl. .................. 361/759; 361/807; 361/810

(58) Field of Classification Search ................. 361/600, 361/679, 1, 679.02, 679.31, 679.32, 724–728, 361/736, 756, 759, 784, 785, 788, 810, 801–803, 361/807, 825; 312/223.1, 223.2; 439/55, 439/59, 61, 65, 152, 159, 160, 527, 540.1, 439/541.5, 607.1
See application file for complete search history.

(56) References Cited

U.S. PATENT DOCUMENTS

| | | | | |
|---|---|---|---|---|
| 5,793,616 A | * | 8/1998 | Aubuchon et al. | 361/784 |
| 6,599,134 B1 | * | 7/2003 | Duarte et al. | 439/61 |
| 7,499,289 B2 | * | 3/2009 | Liang | 361/796 |
| 7,639,507 B2 | * | 12/2009 | Chen et al. | 361/756 |
| 7,645,144 B2 | * | 1/2010 | Tzeng et al. | 439/65 |
| 2004/0240173 A1 | * | 12/2004 | Yi et al. | 361/686 |

* cited by examiner

*Primary Examiner* — Hung S Bui
(74) *Attorney, Agent, or Firm* — Joseph Petrokaitis

(57) ABSTRACT

An apparatus for retaining a computer card in a computer having a riser card has a bracket for receiving the computer card and a retaining member. The retaining member engages the computer card and provides a preload force on the computer card.

25 Claims, 9 Drawing Sheets ered on the motherboard 100. A riser card 108 is mounted on the connector 104. The riser card 108 and a bracket 116 are connected by fasteners. The riser card 108 has a riser card connector 112. An expansion card 120, such as a PCI card, is connected to the riser card connector 112 in a direction substantially parallel to the motherboard 100. Since the expansion card 120 is connected to the riser card 108 through the riser card connector 112, it is easy for the expansion card 120 to break away from the riser card connector 112 under an external force (such as vibration or shock) during transportation.

FIG. 2 shows a riser card 208, a low profile expansion card 200 and a full height bracket 216. The full height bracket 216 receives the low profile expansion card 200 and is fastened to the riser card 208. The low profile expansion card 200 has connectors for connecting with the connectors of the riser card 208. During the transportation of the system, vibration will cause an end 220 of the expansion card 200 to move toward the direction 226. The connector of the expansion card 200 will break away from the connector of the riser card 208.

SUMMARY OF THE INVENTION

In a first aspect of the invention, an apparatus for selectively retaining computer cards of at least two sizes in a computer having a riser card, each of the computer cards having a first card side and a second card side and a first connector mounted on the first card side, includes a bracket for receiving one of the computer cards, comprising a base plate and at least two engaging members mounted on the base plate and facing the computer card, each engaging member corresponding to one of the computer cards of at least two sizes, wherein the bracket is fastened to the riser card and the riser card has a second connector mounted thereon for mating with the first connector, and a retaining member pivotly mounted on the base plate and facing the computer card, comprising a first arm for engaging one of the at least two engaging members and a second arm for engaging the second card side, wherein a compression of the first arm and the second arm provides a preload force on the computer card substantially toward the second connector.

In another aspect of the invention, an apparatus for retaining a computer card in a computer having a riser card, the computer card having a first card side and a second card side and a first connector mounted on said first card side, includes a bracket for receiving the computer card, comprising a base plate and an engaging member mounted on the base plate and facing the computer card, wherein the bracket is fastened to the riser card and the riser card has a second connector mounted thereon for mating with the first connector, and a retaining member pivotly mounted on the base plate and facing the computer card, comprising a first arm for engaging the engaging member and a second arm for engaging the second card side.

In a further aspect of the invention, a data processing system includes a motherboard, a riser card mounted on the motherboard, and an apparatus for selectively retaining computer cards of at least two sizes, each of the computer cards having a first card side and a second card side and a first connector mounted on the first card side, comprising a bracket for receiving one of the computer cards, comprising a base plate and at least two engaging members mounted on the base plate and facing the computer card, each engaging member corresponding to one of the computer cards of at least two sizes, wherein the bracket is fastened to the riser card and the riser card has a second connector mounted thereon for mating with the first connector, and a retaining member pivotly mounted on the base plate and facing the computer card, comprising a first arm for engaging one of the at least two engaging members and a second arm for engaging the second card side, wherein a compression of the first arm and second arm provides a preload force on the computer card substantially toward the second connector.

In another aspect of the invention, a data processing system includes a motherboard, a riser card mounted on the motherboard, and an apparatus for retaining a computer card, the computer card having a first card side and a second card side and a first connector mounted on the first card side, comprising a bracket for receiving the computer card, comprising a base plate and an engaging member mounted on the base plate and facing the computer card, wherein the bracket is fastened to the riser card and the riser card has a second connector mounted thereon for mating with the first connector, and a retaining member pivotly mounted on the base plate and facing the computer card, comprising a first arm for engaging the engaging member and a second arm for engaging the second card side.

DETAILED DESCRIPTION OF EMBODIMENTS OF THE INVENTION

Figure 1:
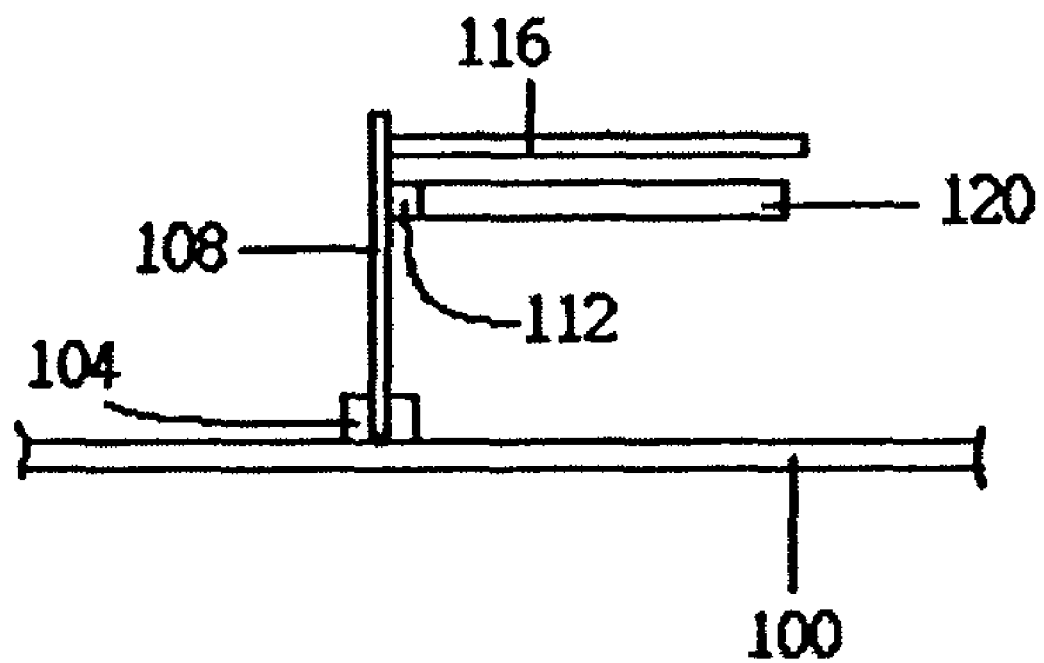
FIG. 1 shows a side view of an expansion card in a typical 1U rack system.
Figure 2:
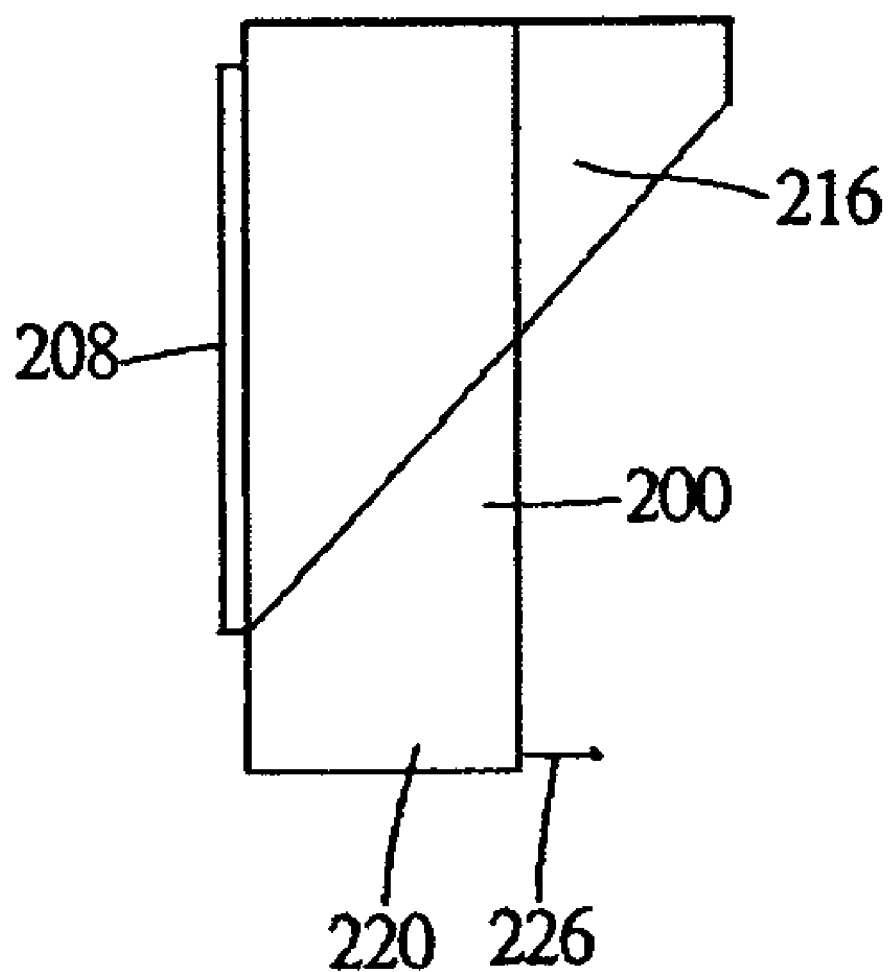
FIG. 2 shows a top view of a low profile expansion card in a typical 1U rack system.
Figure 3:
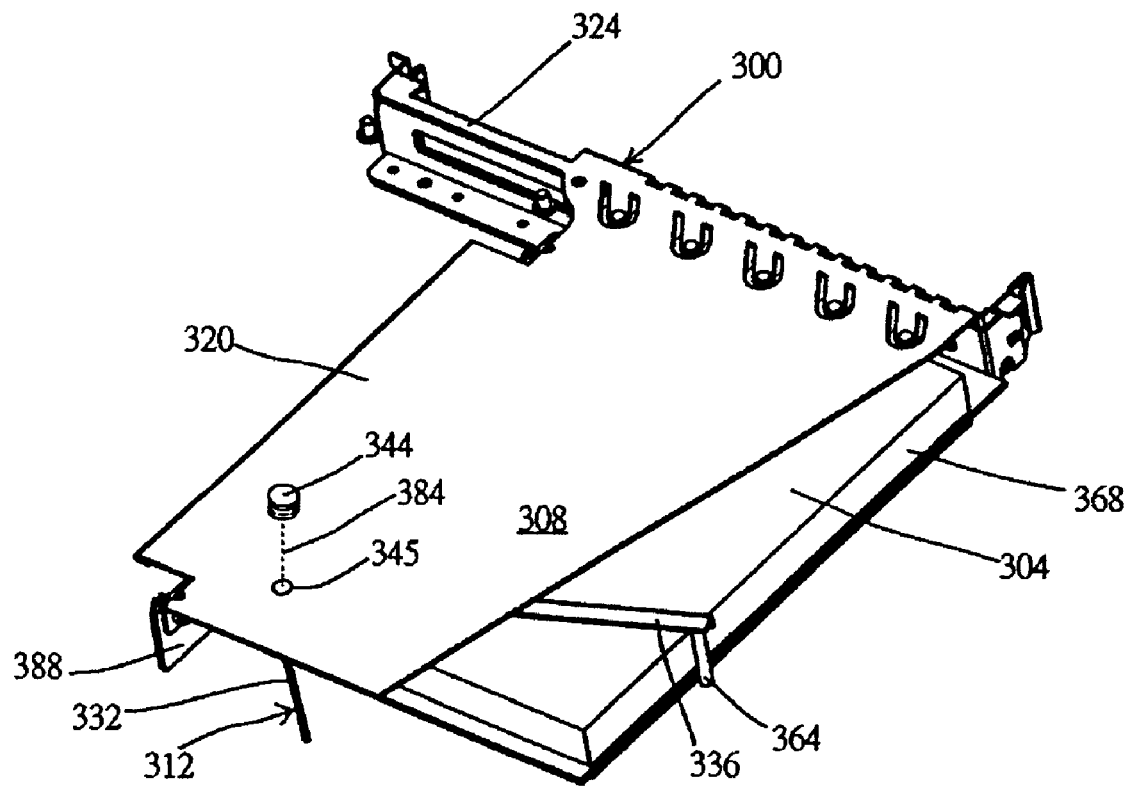
FIG. 3 shows a front view of a retaining apparatus in accordance with an embodiment of the invention.

Referring to FIG. 3, a retaining apparatus 300 selectively retains computer cards of two or more sizes, such as a full height expansion card or a low profile expansion card. The retaining apparatus 300 comprises a bracket 308 and a retaining member 312. The bracket 308 is used for receiving a full height expansion card 304 and for connecting to a riser card 388. The full height expansion card 304 has a first card side (not shown) and a second card side 368. A first connector 392

Figure 6:
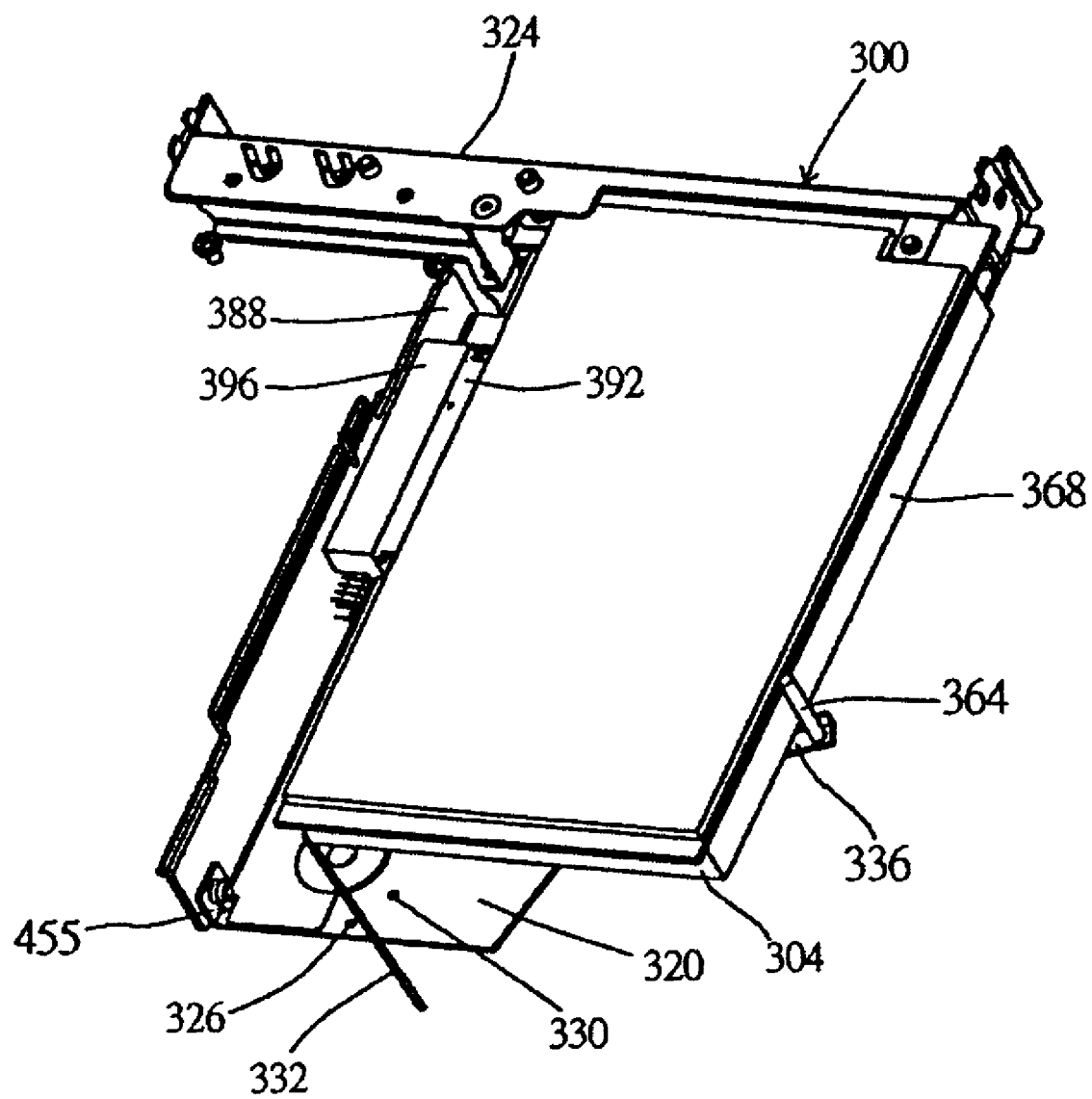
FIG. 6 shows a bottom view of a retaining apparatus in accordance with an embodiment of the invention.

(as shown in FIG. 6) is mounted on the first card side. The first connector 392 can be a golden finger connector.

The bracket 308 comprises a base plate 320 and a side plate 324. The side plate 324 is substantially perpendicular to the base plate 320. The riser card 388 is fastened to a side of the base plate 320 by fasteners 455 (as shown in FIG. 6). The riser card 388 and the base plate 320 are substantially perpendicular. The fastened riser card 388 and the side plate are substantially perpendicular. An inner side of the riser card 388 has a second connector 396 (as shown in FIG. 6). After the full height expansion card 304 is inserted into the bracket 308 of the retaining apparatus 300, the first connector 392 can mate with the second connector 396.

Referring to FIG. 6, two engaging members 326 and 330 are mounted on an inner side of the base plate 320. When a full height expansion card is to be inserted into the bracket 308 of the retaining apparatus 300, the engaging member 326 is selected for use. When a low profile expansion card is to be inserted into the bracket 308 of the retaining apparatus 300, the engaging member 330 is selected for use.

The retaining member 312 comprises a first arm 332 and a second arm 336, pivotly mounted on an inner side of the base plate 320 and facing the expansion card 304. The first arm 332 and the second arm 336 are made of resilient materials. The first arm 332 and the second arm 336 can be in a compressive status, defined as a "work mode". Also, the first arm 332 and the second arm 336 can be in a non-compressive status, defined as a "non work mode". When the first arm 332 and the second arm 336 are in the compressive status (work mode), a preload force substantially toward the second connector 396 is provided by the retaining member 312. The preload force is in a proportional relationship with an angle between the first arm 332 and the second arm 336. The details of these modes will be described in the following paragraphs.

Figure 4:
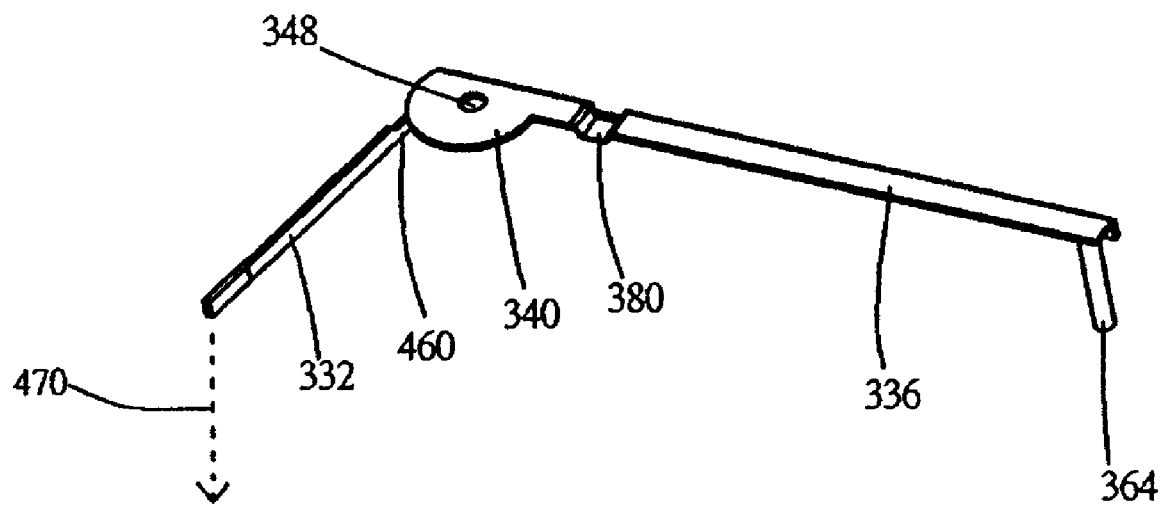
FIG. 4 shows a retaining member in accordance with an embodiment of the invention.

Referring to FIG. 4, the first arm 332 and the second arm 336 of the retaining member 312 are sheet metal arms in accordance with an embodiment of the invention. The retaining member 312 also comprises a connection part 340, which connects the first arm 332 and the second arm 336. A mounting hole 348 is formed on the connection part 340.

Referring to FIG. 3, a fastener 344 is in cooperation with the mounting hole 348 of the connection part 340 and a mounting hole 345 of the bracket 308 to pivotly mount the retaining member 312 on the inner side of the base plate 320. The retaining member 312 can then pivot along the axis 384. The first arm 332, the second arm 336 and the connection part 340 can be integral and made of stainless steel plate. The retaining member 312 can also be made of other materials, such as spring wire materials. The fastener 344 can be a rivet or self-staking bolt. The retaining member 312 can be pivotly mounted on the inner side of the base plate 320 by the fastener 344. A free end of the second arm 336 has a hook portion 364. The hook portion 364 can engage with the second card side 368 when the first arm 332 and the second arm 336 are in the compressive status (work mode).

Figure 5:
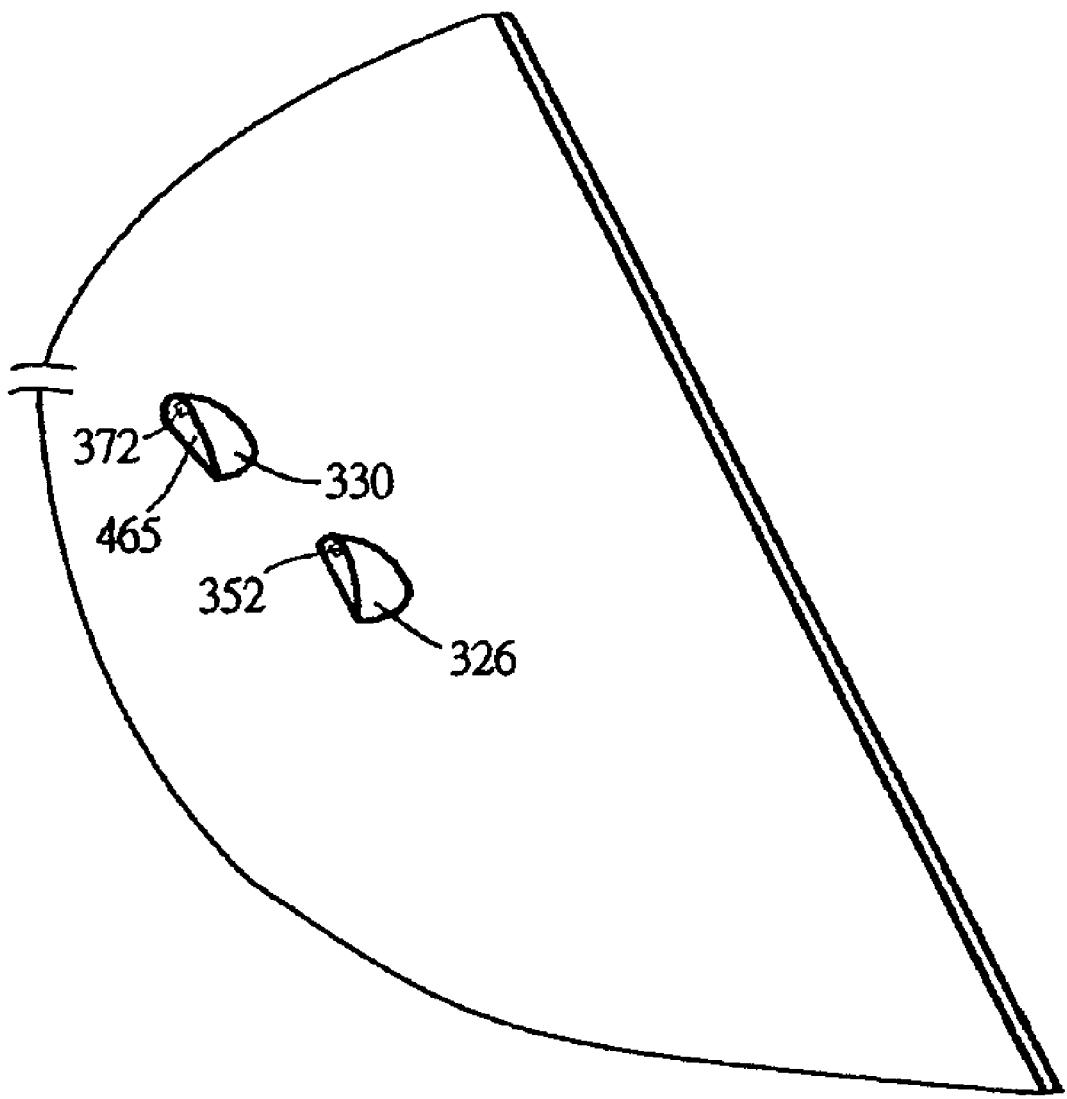
FIG. 5 shows an engaging member in accordance with an embodiment of the invention.

Referring to FIG. 5, engaging members 326, 330 engage with the first arm 332. The engaging members 326, 330 can respectively be a protrusion with an engaging plane 465 for engaging with the first arm 332. The protrusion can be half sheared to form the engaging plane 465. The engaging members 326, 330 can respectively include tabs 352, 372.

Figure 7:
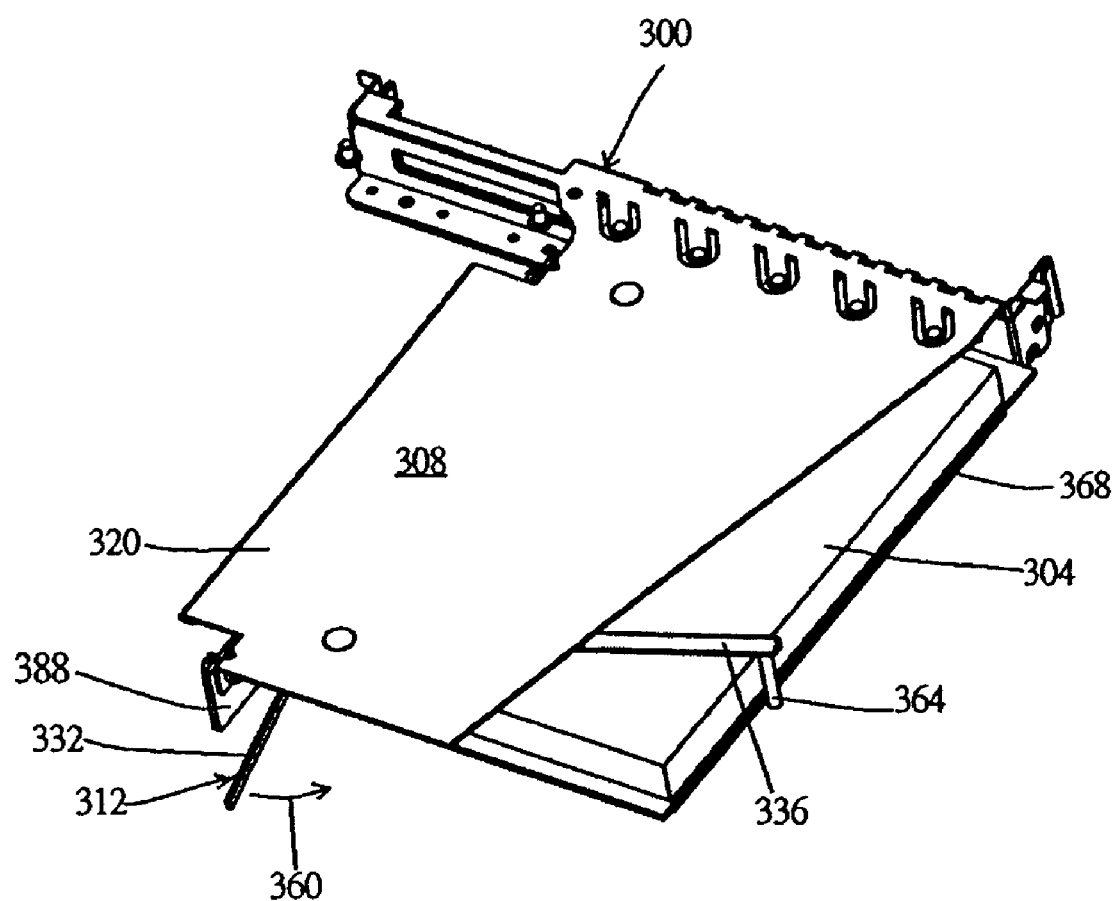
FIG. 7 shows a front view of a retaining apparatus in accordance with an embodiment of the invention.

Referring to FIG. 7, the first arm 332 and the second arm 336 are in a non-compressive status. After the full height expansion card 304 is inserted into the bracket 308 and the full height expansion card 304 and the riser card 388 are connected, the first arm 332 and the second arm 336 are originally in a non-compressive status (non-work mode). At this moment, although the first connector of the expansion card 304 and the second connector of the riser card 388 are connected, they are easily broken away from each other. For securely connecting the expansion card 304 and the riser card 388, a user can allow the hook portion 364 of the second arm 336 to engage with the second card side 368 of the expansion card 304. The user can then exert a force on the first arm 332 in the direction as indicated by the arrow 360 and move the first arm 332 forward until the first arm 332 reaches and crosses the position of the engaging member 326 (the protrusion).

As shown in FIG. 6, the first arm 332 is then engaged by the engaging member 326. After the first arm is engaged with the engaging member 326, the tab 352 (as shown in FIG. 5) can further secure the first arm 332 in the secure position. Thus, the first arm 332 and the second arm 336 are respectively engaged with the engaging member 326 and the second card side 368. The first arm 332 and the second arm 336 are in the compressive status (work mode). A preload force exerting on the expansion card 304 in a direction toward the second connector 396 is generated and the connection status of the expansion card 304 and the riser card 388 is firmly secured. Even under an external force (such as vibration or shock), the first connector 392 of the expansion card 304 and the second connector 396 of the riser card 388 will not easily break away from each other and are in a good connection due to the preload force provided by the retaining member 312.

Referring back to FIG. 4, the first arm 332 also comprises a groove portion 380. The groove portion 380 allows the second arm 336 not to contact the engaging member 326 when the second arm 336 is pivotly moved by the user. The first arm 332 also comprises a narrow portion 460. The narrow portion 460 assists the user in exerting a downward force as indicated by the arrow 470 on the free end of the first arm 332 by his finger. After the first arm 332 is pivotally moved by the user and the first arm 332 reaches and crosses the position of the engaging member 326, the user can release the free end of the first arm 332 and the first arm 332 can be easily engaged with the engaging member 326.

The present invention can be used in many fields. For example, a riser card can be connected to the present retaining apparatus and an expansion card can be contained by present retaining apparatus. The above combination can be mounted on a motherboard. Thus, the bracket receives the computer card in a direction substantially parallel to the motherboard. The preload force provided by the compressed first arm 332 and the second arm 336 is substantially parallel to said motherboard.

Figure 8:
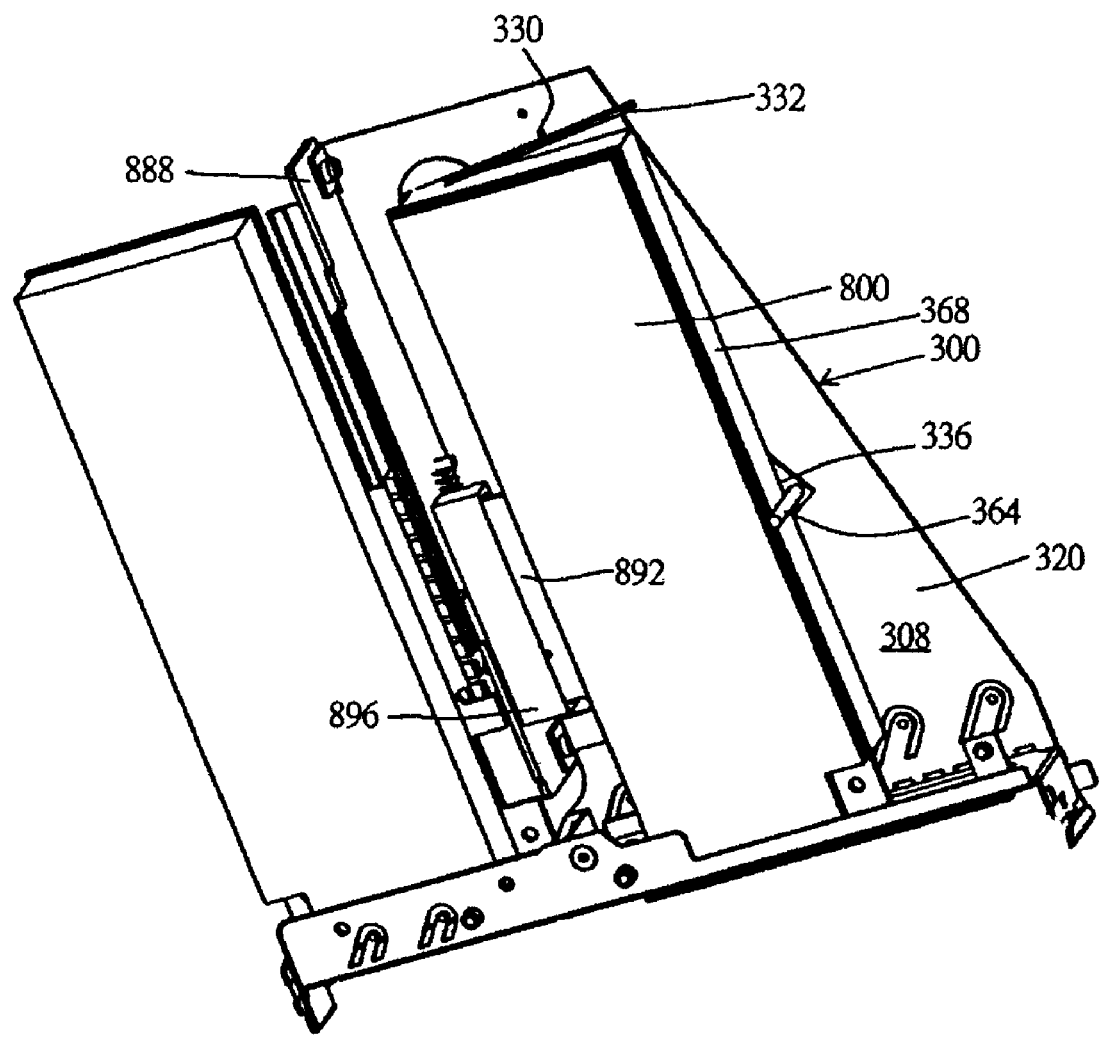
FIG. 8 shows a bottom view of a retaining apparatus in accordance with an embodiment of the invention.

Referring to FIG. 8, a low profile expansion card is inserted into the bracket 300. After the low profile expansion card 800 is inserted into the bracket 308 of the retaining apparatus 300, the engaging member 330 is selected for use. Since the size of the low profile expansion card 800 is smaller than that of the full height expansion card, the selected engaging member 330 for the low profile expansion card 800 is located nearer the interior area of base plate 320. In a previous embodiment, the selected engaging member 326 for the full height expansion card 304 is located farther away from the interior area of base plate 320. The retaining member 312 comprises a first arm 332 and a second arm 336, pivotly mounted on an inner side of the base plate 320 and facing the expansion card 800. The first arm 332 and the second arm 336 are made of resilient materials. The first arm 332 and the second arm 336 can be in a compressive status, defined as a "work mode". The first arm 332 and the second arm 336 also can be in a non-compressive status, defined as a "non work mode". When the first arm 332 and the second arm 336 are in the compressive status (work mode), a preload force substantially toward the second connector 896 is provided by the retaining member 312. The preload force is in a proportional relationship with an angle between the first arm 332 and the second arm 336.

Similar to the above situation for the use of the full height expansion card, after the low profile expansion card 800 is inserted into the bracket 308 and the low profile expansion card 800 and the riser card 888 are connected, the first arm 332 and the second arm 336 are originally in a non-compressive status (non-work mode). At this moment, although the first connector 892 of the expansion card 800 and the second connector 896 of the riser card 888 are connected, they are easily broken away from each other. For securely connecting the expansion card 800 and the riser card 888, the user can allow the hook portion 364 of the second arm 336 to engage with the second card side 368 of the expansion card 800. The user can then exert a force on the first arm and move the first arm 332 forward until the first arm 332 reaches and crosses the position of the engaging member 330 (the protrusion). The first arm is then engaged by the engaging member 330. After the first arm is engaged with the engaging member 330, the tab on the engaging member 330 can further secure the first arm 332 in the secure position. Thus, the first arm 332 and the second arm 336 are respectively engaged with the engaging member 330 and the second card side 368. The first arm 332 and the second arm 336 are in the compressive status (work mode). A preload force exerting on the expansion card 800 in a direction toward the second connector 896 is generated and the connection status of the expansion card 800 and the riser card 888 is well secured. Even under an external force (such as vibration or shock), the first connector 892 of the expansion card 800 and the second connector 896 of the riser card 888 will not easily break away from each other and are in a good connection due to the preload force provided by the retaining member 312.

Figure 9:
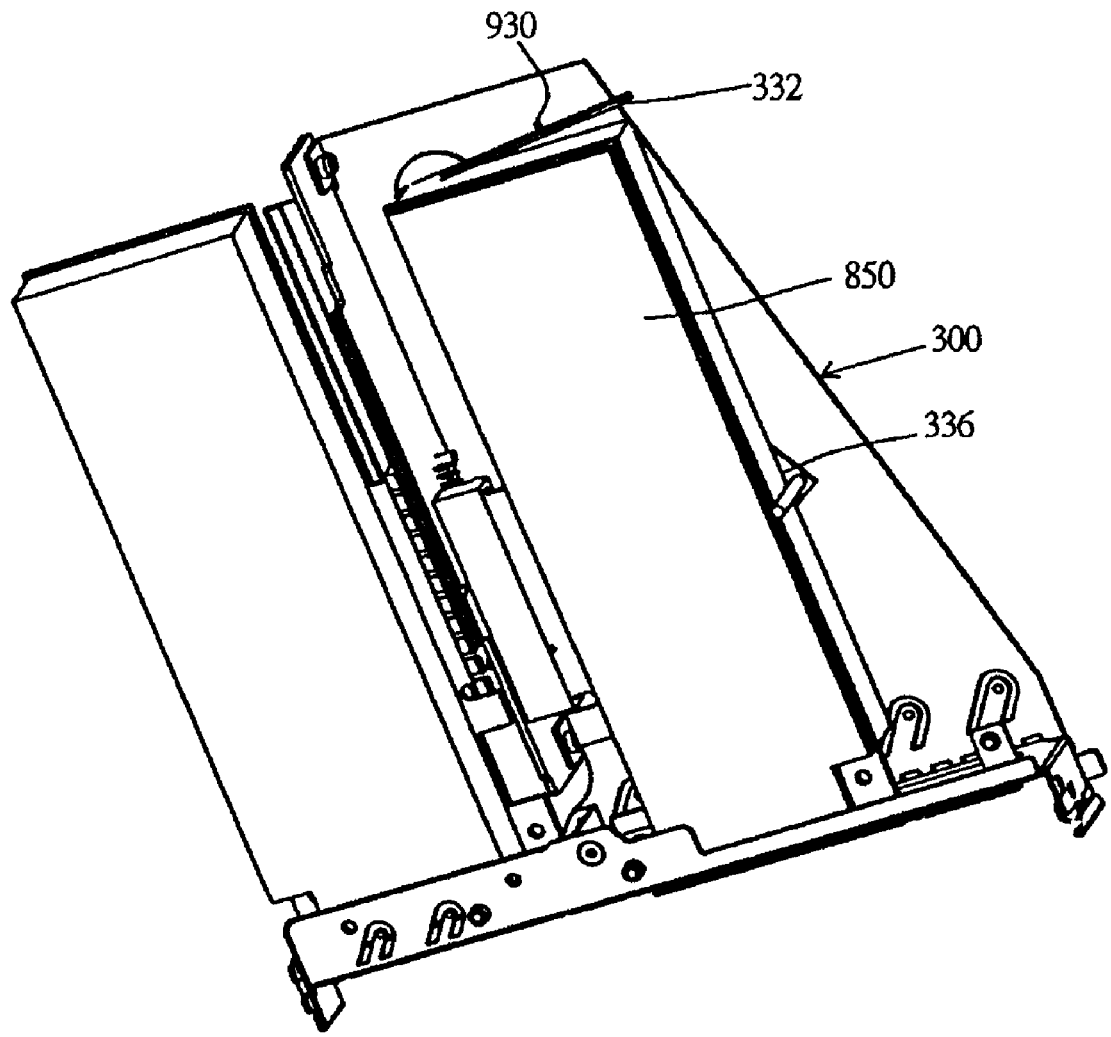
FIG. 9 shows a bottom view of a retaining apparatus in accordance with an embodiment of the invention.

Referring to FIG. 9, the card retaining device is designed especially for a low profile expansion card 850. Only one engaging member 930 is mounted on the inner side of the base plate of the bracket. It is also possible to design a card retaining apparatus especially for a full height expansion card or expansion cards of other sizes. The engaging members may be located in different locations in accordance with different sizes of the expansion cards.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for selectively retaining computer cards of at least two sizes in a computer having a riser card, each of said computer cards having a first card side and a second card side and a first connector mounted on said first card side, comprising:
   a bracket for receiving one of said computer cards, comprising a base plate and at least two engaging members mounted on said base plate and facing said computer card, each engaging member corresponding to one of said computer cards of at least two sizes, wherein said bracket is fastened to said riser card and said riser card has a second connector mounted thereon for mating with said first connector; and
   a retaining member pivotly mounted on said base plate and facing said computer card, comprising a first arm for engaging one of said at least two engaging members and a second arm for engaging said second card side, wherein a compression of said first arm and said second arm provides a preload force on said computer card substantially toward said second connector.

2. The apparatus according to claim 1, wherein said preload force is in a proportional relationship with an angle between said first arm and said second arm.

3. The apparatus according to claim 1, wherein each of said at least two engaging members is a protrusion with an engaging plane for engaging with said first arm, and said protrusion is half sheared to form said engaging plane.

4. The apparatus according to claim 3, wherein said protrusion further comprises a tab for securing said first arm in a secure position in response to said first arm engaging with said protrusion.

5. The apparatus according to claim 4, wherein said second arm further comprises a hook portion substantially perpendicular to said second arm for securely engaging with said second card side.

6. The apparatus according to claim 5, wherein said hook portion of said second arm engages with said second card side, said first arm engages with said engaging plane of said engaging member and said tab secures said first arm in said secure position compressing said retaining member and providing said preload force toward said computer card.

7. The apparatus according to claim 1, wherein said base plate of said bracket is substantially perpendicularly fastened to said riser card, said second connector is mounted on a surface of said riser card and said base plate and said computer card are substantially parallel when said computer card is retained in said retaining apparatus.

8. The apparatus according to claim 1, wherein said riser card is mounted on a motherboard, and said bracket receives said computer card in a direction substantially parallel to said motherboard, and said preload force is exerted on said computer card in a direction substantially parallel to said motherboard.

9. The apparatus according to claim 1, wherein said first arm and second arm are metal or spring wire arms.

10. The apparatus according to claim 1, wherein said preload force is substantially toward said second connector.

11. An apparatus for retaining a computer card in a computer having a riser card, said computer card having a first card side and a second card side and a first connector mounted on said first card side, comprising:
    a bracket for receiving said computer card, comprising a base plate and an engaging member mounted on said base plate and facing said computer card, wherein said bracket is fastened to said riser card and said riser card has a second connector mounted thereon for mating with said first connector; and
    a retaining member pivotly mounted on said base plate and facing said computer card, comprising a first arm for engaging said engaging member and a second arm for engaging said second card side.

12. The apparatus according to claim 11, wherein said engaging member is a protrusion with an engaging plane for engaging with said first arm, and said protrusion is half sheared to form said engaging plane.

13. The apparatus according to claim 12, wherein said protrusion further comprises a tab for securing said first arm in a secure position in response to said first arm engaging with said protrusion.

14. The apparatus according to claim 13, wherein said second arm further comprises a hook portion substantially perpendicular to said second arm for securely engaging with said second card side.

15. The apparatus according to claim 14, wherein said hook portion of said second arm engages with said second card side, said first arm engages with said engaging plane of said engaging member and said tab secures said first arm in said secure position compressing said retaining member and providing said preload force toward said computer card.

16. The apparatus according to claim 11, wherein said base plate of said bracket is substantially perpendicularly fastened to said riser card, said second connector is mounted on a surface of said riser card and said base plate and said computer card are substantially parallel when said computer card is retained in said retaining apparatus.

17. The apparatus according to claim 11, wherein said riser card is mounted on a motherboard, and said bracket receives said computer card in a direction substantially parallel to said motherboard, and said preload force is exerted on said computer card in a direction substantially parallel to said motherboard.

18. The apparatus according to claim 11, wherein said first arm and second arm are metal or spring wire arms.

19. The apparatus according to claim 11, wherein a compression of said first arm and second arm provides a preload force on said computer card and said preload force is in a proportional relationship with an angle between said first arm and said second arm.

20. The apparatus according to claim 19, wherein said preload force is substantially toward said second connector.

21. A data processing system, comprising:
a motherboard;
a riser card mounted on said motherboard; and
an apparatus for selectively retaining computer cards of at least two sizes, each of said computer cards having a first card side and a second card side and a first connector mounted on said first card side, comprising:
a bracket for receiving one of said computer cards, comprising a base plate and at least two engaging members mounted on said base plate and facing said computer card, each engaging member corresponding to one of said computer cards of at least two sizes, wherein said bracket is fastened to said riser card and said riser card has a second connector mounted thereon for mating with said first connector; and
a retaining member pivotly mounted on said base plate and facing said computer card, comprising a first arm for engaging one of said at least two engaging members and a second arm for engaging said second card side, wherein a compression of said first arm and second arm provides a preload force on said computer card substantially toward said second connector.

22. The data processing system according to claim 21, wherein said preload force is in a proportional relationship with an angle between said first arm and said second arm, said bracket receives said computer card in a direction substantially parallel to said motherboard and said preload force is exerted on said computer card in a direction substantially parallel to said motherboard.

23. A data processing system, comprising:
a motherboard;
a riser card mounted on said motherboard; and
an apparatus for retaining a computer card, said computer card having a first card side and a second card side and a first connector mounted on said first card side, comprising:
a bracket for receiving said computer card, comprising a base plate and an engaging member mounted on said base plate and facing said computer card, wherein said bracket is fastened to said riser card and said riser card has a second connector mounted thereon for mating with said first connector; and
a retaining member pivotly mounted on said base plate and facing said computer card, comprising a first arm for engaging said engaging member and a second arm for engaging said second card side.

24. The data processing system according to claim 23, wherein a compression of said first arm and second arm provides a preload force on said computer card substantially toward said second connector and said preload force is in a proportional relationship with an angle between said first arm and said second arm.

25. The data processing system according to claim 24, wherein said bracket receives said computer card in a direction substantially parallel to said motherboard, and said preload force is exerted on said computer card in a direction substantially parallel to said motherboard.

\* \* \* \* \*